(12) United States Patent
Graham et al.

(10) Patent No.: US 10,941,003 B2
(45) Date of Patent: Mar. 9, 2021

(54) CATENARY TROUGHING IDLER

(71) Applicant: GEORGETOWN RAIL EQUIPMENT COMPANY, Georgetown, TX (US)

(72) Inventors: Joshua A. Graham, Austin, TX (US); Charles W. Aaron, Georgetown, TX (US)

(73) Assignee: Loram Technologies, Inc., Georgetown, TX (US)

( * ) Notice: Subject to any disclaimer, the term of this patent is extended or adjusted under 35 U.S.C. 154(b) by 0 days.

(21) Appl. No.: 16/696,973

(22) Filed: Nov. 26, 2019

(65) Prior Publication Data

US 2020/0172342 A1 Jun. 4, 2020

Related U.S. Application Data

(60) Provisional application No. 62/774,992, filed on Dec. 4, 2018.

(51) Int. Cl.
| | |
|---|---|
| *B65G 39/04* | (2006.01) |
| *B65G 21/12* | (2006.01) |
| *B65G 39/09* | (2006.01) |
| *B65G 15/08* | (2006.01) |

(52) U.S. Cl.
CPC ............. *B65G 39/04* (2013.01); *B65G 15/08* (2013.01); *B65G 21/12* (2013.01); *B65G 39/09* (2013.01)

(58) Field of Classification Search
None
See application file for complete search history.

(56) References Cited

U.S. PATENT DOCUMENTS

| | | | | |
|---|---|---|---|---|
| 2,781,124 A | * | 2/1957 | Troller | B65G 39/14 198/824 |
| 2,876,890 A | * | 3/1959 | Baechli | B65G 39/04 198/824 |
| 4,011,938 A | * | 3/1977 | Kain | B65G 39/09 198/824 |

(Continued)

FOREIGN PATENT DOCUMENTS

| | | |
|---|---|---|
| AT | 221417 B | 5/1963 |
| GB | 806605 A | 12/1958 |

OTHER PUBLICATIONS

European Patent Office—International Searching Authority; International Search Report and Written Opinion for Application No. PCT/US2019/063651 dated Mar. 26, 2020.

*Primary Examiner* — Kavel Singh
(74) *Attorney, Agent, or Firm* — Parsons Behle & Latimer

(57) ABSTRACT

A catenary idler comprises a cable, a plurality of bearing surfaces disposed along a length of the cable, and a plurality of rollers disposed over the plurality of bearing surfaces. The plurality of bearing surfaces are fixed to the cable. The plurality of bearing surfaces may be a plurality of clamps. The plurality of rollers are rotatably supported upon the plurality of bearing surfaces. The cable may be rotatably supported at its ends. The catenary idler may include a first compression spring at a first end of the cable and a second compression spring at a second end of the cable. The rollers may be formed of an oil filled nylon. A conveyor belt impact bed includes a frame, a plurality of catenary idlers supported upon the frame, and a conveyor belt supported upon the plurality of catenary idlers.

22 Claims, 7 Drawing Sheets

(56) References Cited

U.S. PATENT DOCUMENTS

| | | | | |
|---|---|---|---|---|
| 4,144,964 A | * | 3/1979 | Valcalda | B65G 39/14 198/808 |
| 4,196,805 A | * | 4/1980 | Banno | B65G 39/02 198/827 |
| 4,301,109 A | * | 11/1981 | Kain | B29C 31/041 198/824 |
| 4,720,007 A | * | 1/1988 | Milek | B65G 39/04 198/827 |

* cited by examiner

CATENARY TROUGHING IDLER

RELATED APPLICATIONS

This application claims the benefit of U.S. Provisional Patent Application Ser. No. 62/774,992, filed on Dec. 4, 2018 and entitled "Catenary Troughing Idler," the contents of which are incorporated herein by reference in its entirety.

FIELD OF THE DISCLOSURE

The embodiments described herein relate to handling materials, particularly a conveying system such as a conveyor belt impact bed that utilizes a high impact absorbing catenary idler. In particular, the embodiments described herein relate to catenary idlers for absorbing impact.

BACKGROUND

A catenary idler is a troughing idler that is not rigid, supported at its two ends, and is used to support a load on a carry side of a conveyor belt. Known catenary idlers are often inadequate to handle extremely high impact loads in applications where an impact bed is typically used or from very large aggregate dropped from several feet above. Known catenary idlers are generally of two types.

In a first type of catenary idler 10 (shown in FIG. 7), a shape is formed by connecting multiple rollers 15 to each other in series allowing at least one degree of pivot in a vertical axis at each connection point 14. Each roller 15 has a shaft 11 along its axis 12 that forms a link of the catenary idler 10 and a bearing 13 at each end of each roller 15, such that each roller 15 rotates about its shaft 11, but the shaft 11 does not rotate. For purposes of illustration, rollers 15 have been removed from the shafts 11 of the end links. When a roller 15 is damaged, the connection points 14 of the link are removed and replaced. In addition, the pivot connections may only permit limited movement in one axis and may contact each other at high troughing angles. Furthermore, these catenary idlers 10 may bind when friction from a conveyor belt induces friction in another axis, such as along the length of the conveyor belt, that is outside the range of motion permitted by the pivotal connection. Other disadvantages may exist.

In a second type of catenary idler 20 (shown in FIG. 8), a shape is formed by a steel cable 21 which has thrust bearings at its two ends, the cable 21 has rubber, plastic or urethane cast onto it in short cylindrical sections to form integral rollers 25, but the entire cable 21 rotates rather than the rollers 25 rotating about the cable 21. If a roller 25 is damaged, the roller 25 may be cut out and a new section of rollers 25 spliced into its place. However, this may create a weak spot in the catenary idler 20. In addition, if one section, such as section 26, of the catenary idler 20 is caused to rotate more quickly than another section, such as section 27, or in another direction, at least some of the rollers 25 may slide against the conveyor belt instead of roll. Also, a difference in rotational speeds between sections may induce a twist along the length of the cable 21. Other disadvantages may exist.

An impact bed 30 (shown in FIG. 9) consists of a rigid frame platform 31 that supports a conveyor belt (not shown) and usually has a stationary, low friction surface 32 that the conveyor belt can slide past. An impact bed 30 is confined to the loading zone of a conveying system and does not span the length of the entire conveyor belt. Other disadvantages may exist.

SUMMARY

The present disclosure is related to catenary idlers that overcome some of the problems and disadvantages discussed above. The catenary idlers may provide improved impact absorption associated with the loading procedures of certain conveying systems.

An embodiment of a catenary idler includes a cable with low friction, sliding, bearing surfaces for individual rollers distributed at a predetermined frequency along a length of the cable.

An embodiment of a catenary idler comprises a cable, a plurality of bearing surfaces disposed along a length of the cable, and a plurality of rollers disposed over the plurality of bearing surfaces. The plurality of bearing surfaces are fixed to the cable. The plurality of rollers are rotatably supported upon the plurality of bearing surfaces.

The catenary idler may include a first compression spring at a first end of the cable and a second compression spring at a second end of the cable. The catenary idler may include a washer disposed on the first end of the cable. The cable may pass through a center of the first compression spring. The first compression spring is disposed between the washer and a conveyor frame. The plurality of bearing surfaces may be a plurality of clamps. The plurality of clamps may be a plurality of metal clamps. The cable may be rotatably supported at its first end and its second end. The rollers may be formed of a material having a low coefficient of friction. The rollers may be formed of an oil impregnated nylon. The plurality of bearing surfaces may each have a concaved, cylindrical shape. The plurality of rollers may each include an inner bore. A diameter of the inner bore increases along a length of the roller away from a center of the roller. A first end of the cable may include a swaged fitting having an outer diameter. The inner bore of each of the plurality of rollers is greater than the outer diameter of the swaged fitting. One or more of the plurality of rollers may be supported upon adjacent bearing surfaces of the plurality of bearing surfaces.

An embodiment of a method of installing a catenary idler includes providing a cable, fixedly attaching a plurality of bearing surfaces along a length of the cable and disposing a plurality of rollers rotatably over the plurality of bearing surfaces, the plurality of rollers being supported upon the plurality of bearing surfaces.

The method may include supporting one or more of the plurality of rollers upon adjacent bearing surfaces of the plurality of bearing surfaces. The method may include slipping the plurality of rollers over a first end of the cable and sliding the plurality of rollers along the length of the cable. The method may include cutting out and removing a first roller of the plurality of rollers, the first roller being adjacent to a second roller of the plurality of rollers. The method may include sliding the second roller along the length of the cable to occupy a space previously occupied by the first roller.

An embodiment of conveying system includes a frame, a plurality of catenary idlers supported upon the frame, and a conveyor belt supported upon the plurality of catenary idlers. Each of the plurality of catenary idlers includes a cable, a plurality of bearing surfaces disposed along a length of the cable, the plurality of bearing surfaces being fixed to the cable, and a plurality of rollers rotatably disposed over the plurality of bearing surfaces, the plurality of rollers being supported upon the plurality of bearing surfaces.

Figure 1:
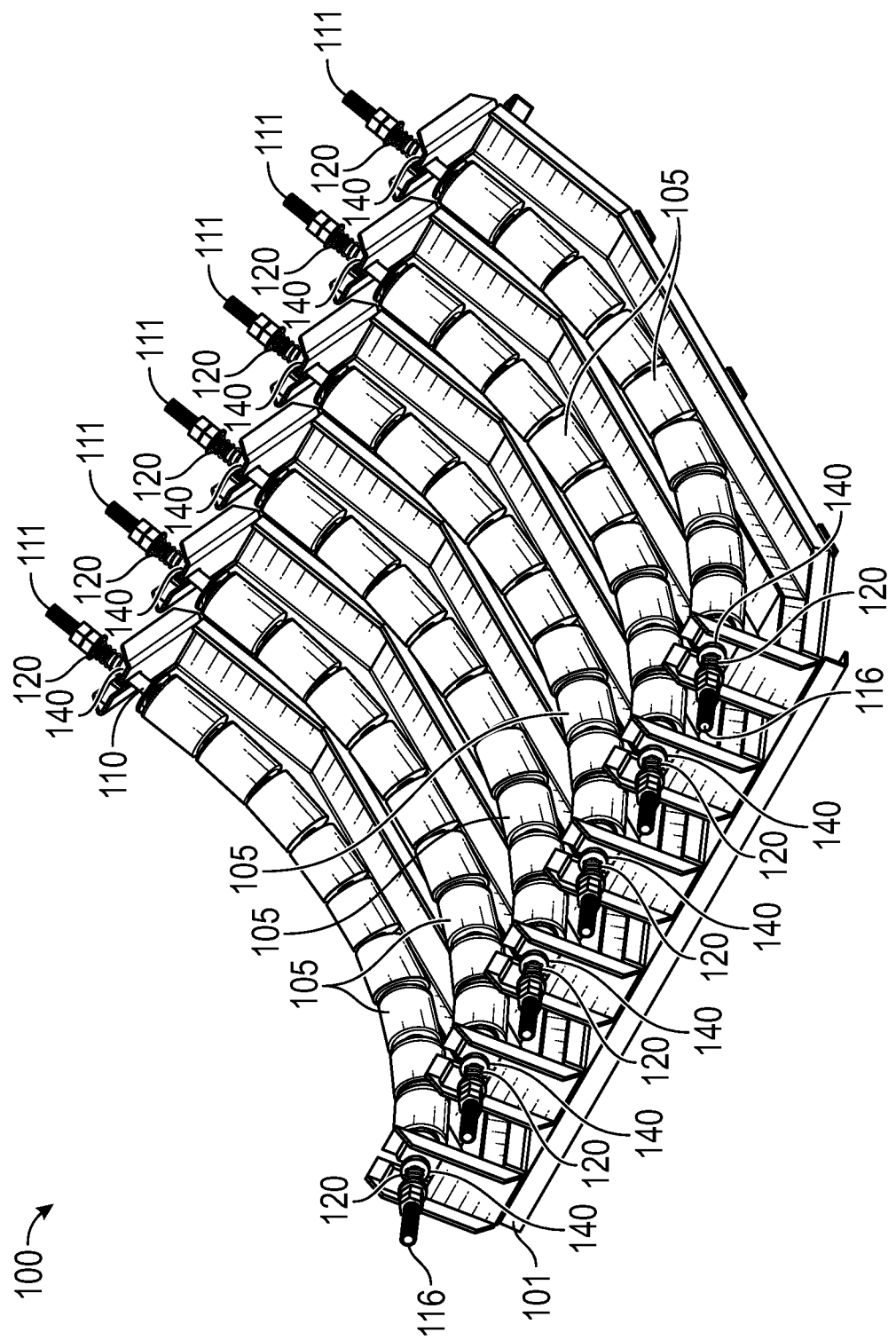
FIG. 1 shows an embodiment of a conveying system forming an impact bed.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the scope of the invention as defined by the appended claims.

DESCRIPTION

FIG. 1 shows an embodiment of a conveying system 100 including a plurality of catenary idlers 105 supported upon a frame 101. The catenary idlers 105 are each supported upon the frame 101 at a first end 111 and a second end 116. Each of the first end 111 and the second end 116 may be supported upon the frame 101 by an elastically deformable member, such as a compression spring 120. The elastically deformable member is configured to absorb a portion of an impact from materials being placed on the plurality of catenary idlers 105. Each of the first end 111 and the second end 116 may be supported upon the frame 101 by a thrust bearing 140. A conveyor belt 160 (shown in FIG. 2) is supported upon the plurality of catenary idlers 105 in order to carry a payload.

Figure 2:
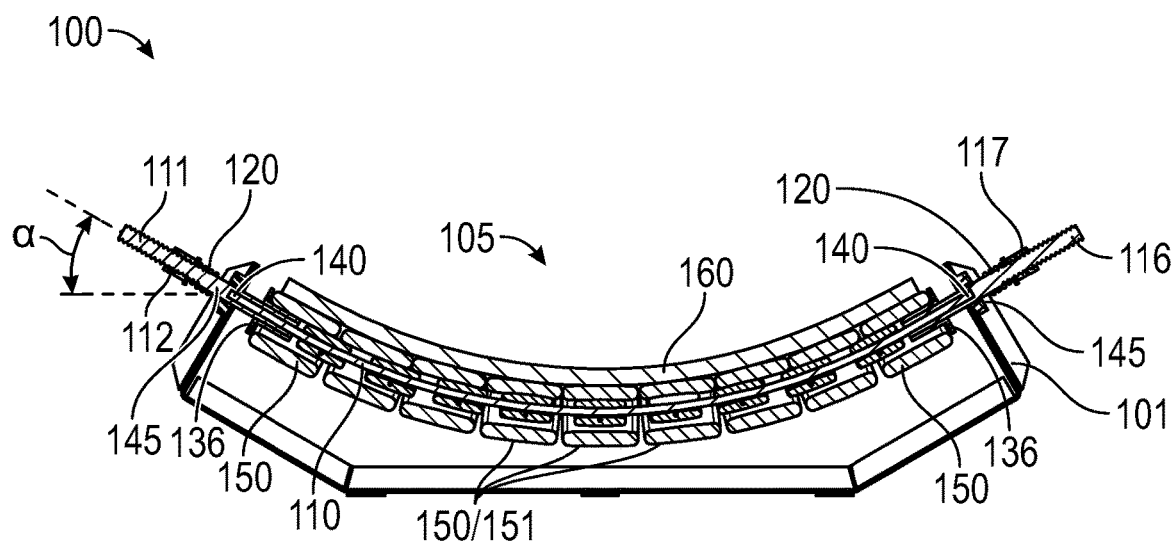
FIG. 2 shows a cross-sectional view of the embodiment of the conveying system of FIG. 1.
Figure 3:
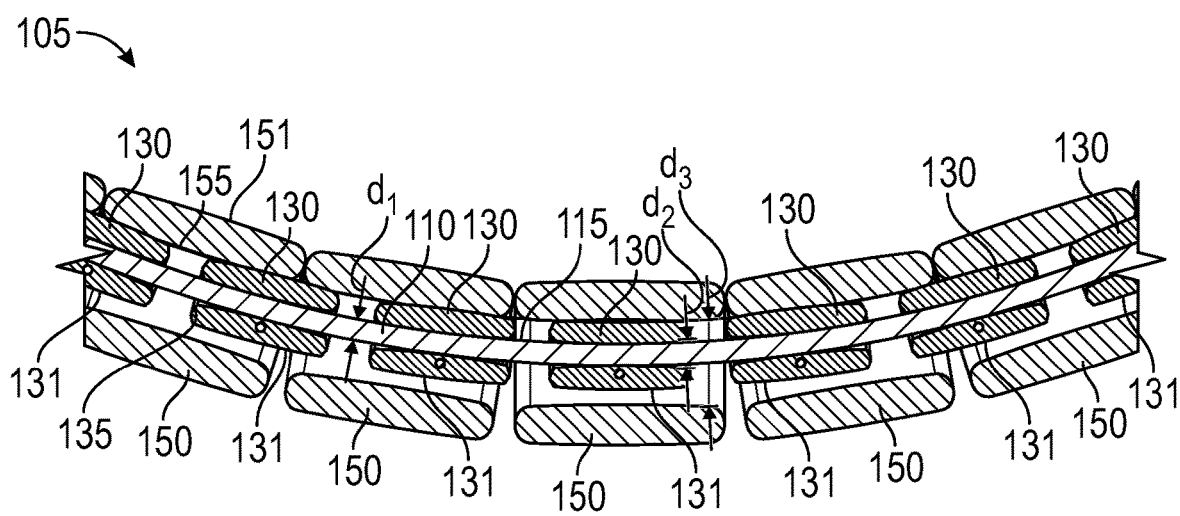
FIG. 3 shows a cross-sectional view of a portion of an embodiment of a catenary idler.

FIG. 2 shows a cross-sectional view of the conveying system 100. The plurality of catenary idlers 105 supported upon the frame 101 form a trough-shape. The conveyor belt 160 deforms with the shape of the catenary idlers 105. The catenary idlers 105 includes a length of a cable 110 extending between the first end 111 and the second end 116 of the catenary idlers 105. The cable 110 may be a twisted steel cable 110. FIG. 3 is a detailed view of a portion of the catenary idler 105. Referring to FIGS. 2 and 3, an embodiment of a catenary idler 105 includes bearing surfaces 131 distributed along the length of the cable 110 and a plurality of rollers 150 supported upon the bearing surfaces 131. The bearing surfaces 131 are fixed to the cable 110 such that they do not rotate with respect to the cable 110. The bearing surfaces 131 may be distributed along the length of the cable 110 in a predetermined frequency. For example, in some embodiments, a bearing surface 131 may be 3-inches in length and may be spaced on 4-inch centers may be used. The bearing surface 131 provides a low-friction, sliding surface for rollers 150 that form the shape of the catenary idler 105. The bearing surfaces 131 also prevent direct contact with and wear on the cable 110 by the rollers 150.

The bearing surfaces 131 may be cast upon the cable 110. In some embodiments, the bearing surfaces 131 may be clamps 130 having a circular outer cross-section. The bearing surfaces 131 may be a concaved, cylindrical shape. The clamps 130 may be formed of metal. An inner bore 135 of the clamp 130 is positioned around the outer surface 115 of the cable 110 and compressed to a width less than or equal to the diameter $d_1$ of the cable 110 in order to prevent movement of the clamp 130 with respect to the cable 110. A diameter $d_2$ of the inner bore 135 of the clamp 130 may increase along the length of the clamp 130 away from the center of the clamp 130 to permit the cable 110 to further conform to the trough shape. Adjacent rollers 150 can rotate independently from one another. Each of the rollers 150 are supported upon at least one bearing surface 131. In some instances, one or more of the plurality of rollers 150 may be supported upon a plurality of adjacent bearing surfaces 131. For example, a width of the rollers 150 may be selected such that the roller 150 is supported upon at least two bearing surfaces 131. The roller 150 may have a shape that conforms to the dynamics of a changing trough shape. The circular clamp 130 may also have a shape that conforms to the dynamics of a changing trough shape. The catenary idler 105 may have a troughing angle α is of up to 90 degrees.

The rollers 150 and bearing surfaces 131 are formed of materials with a low coefficient of friction such that the rollers 150 are slidable and rotatable upon the bearing surfaces 131. As used herein, a low coefficient of friction is less than 0.25. Preferably, a material having a coefficient of friction of less than 0.1 may be used. The rollers 150 may be made of a self-lubricating composite material that produces low friction when it contacts the bearing surfaces 131 and has properties to absorb high impact forces. The rollers 150 may be formed of an oil impregnated nylon. In some embodiments, the rollers 150 may be formed of a thermoplastic polyethylene, such as ultra-high-molecular-weight polyethylene.

Figure 5:
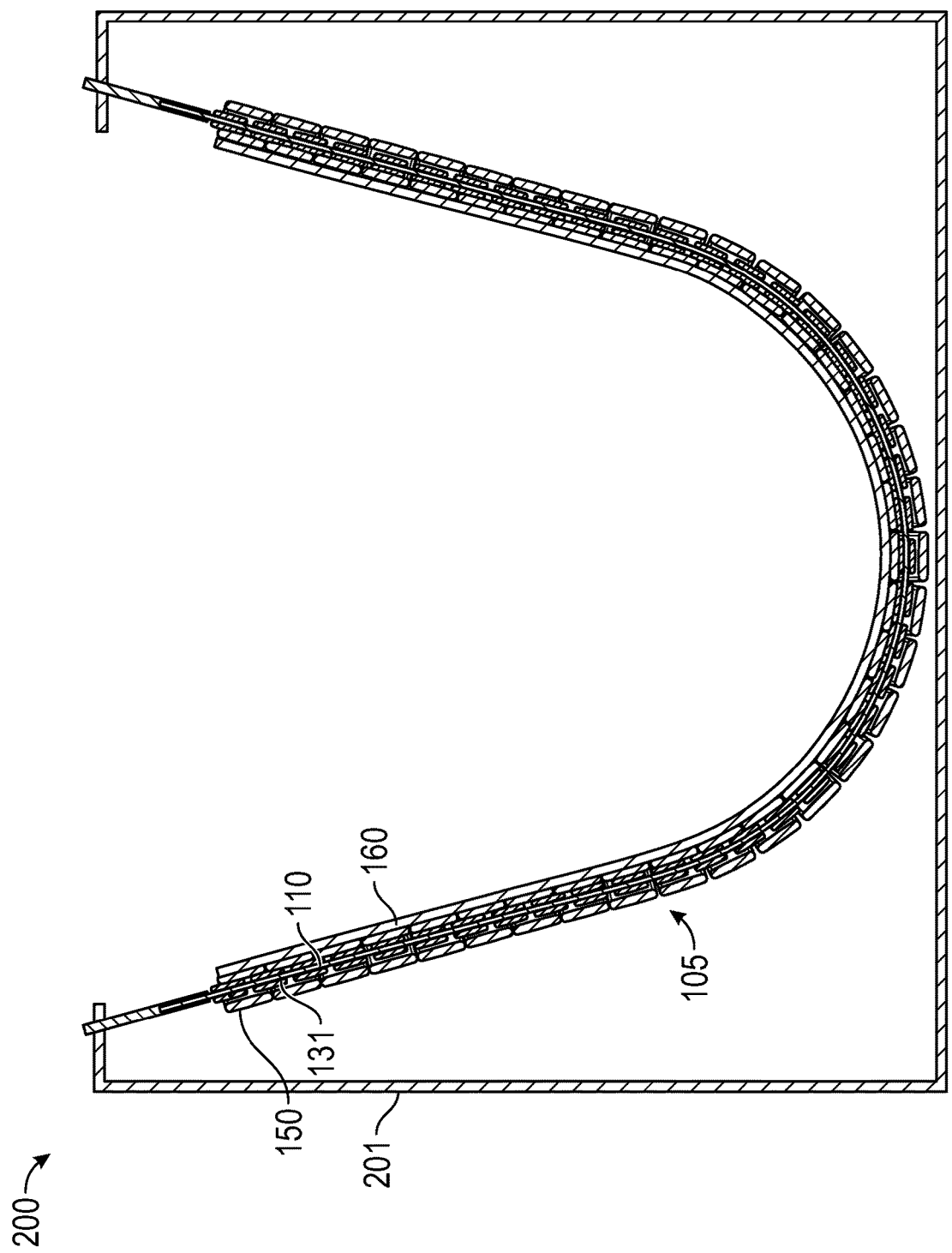
FIG. 5 shows an embodiment of a mobile conveying system.
Figure 7:
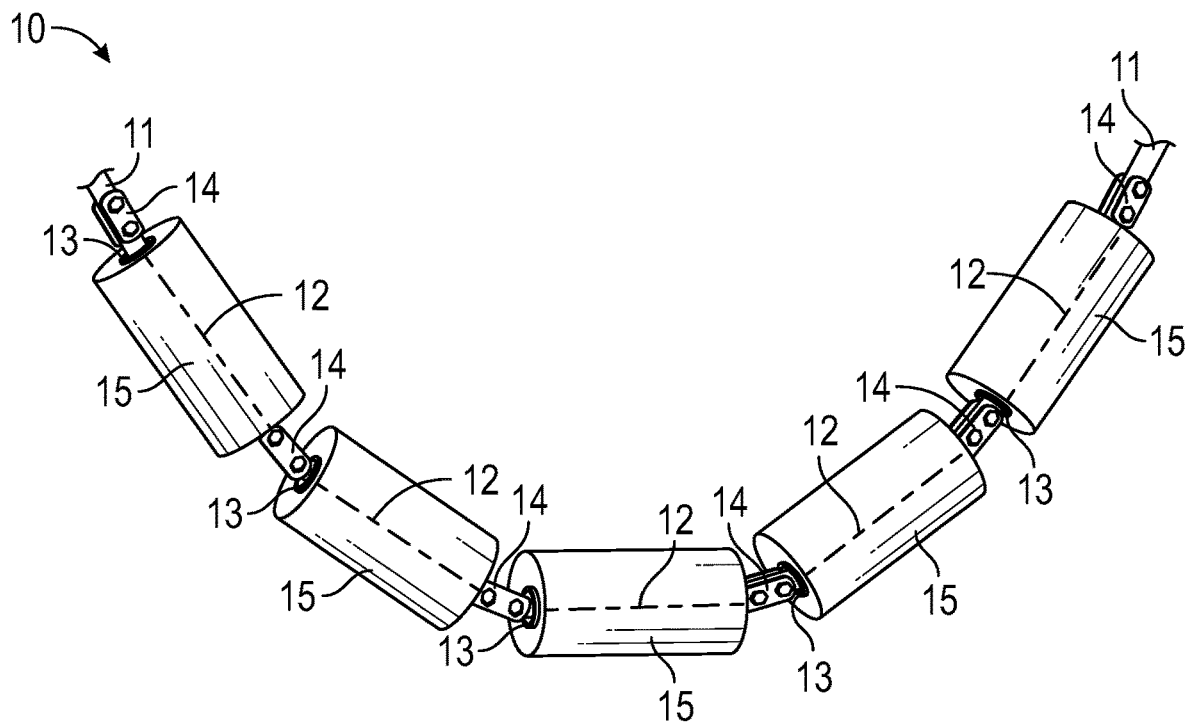
FIG. 7 shows a known catenary idler.
Figure 8:
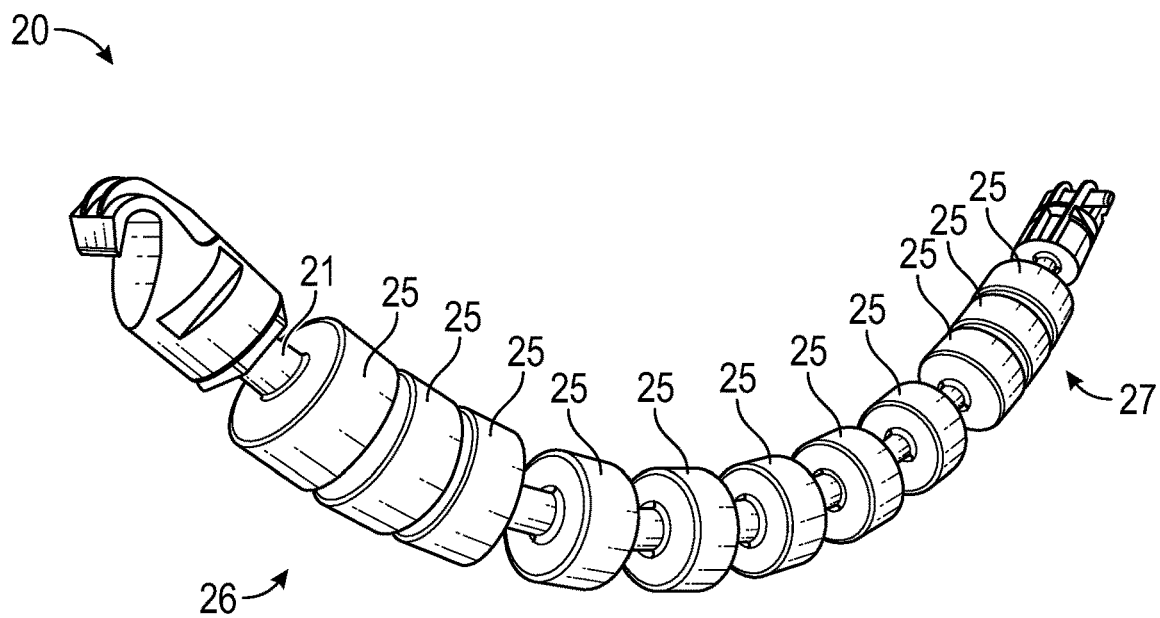
FIG. 8 shows a known catenary idler.
Figure 9:
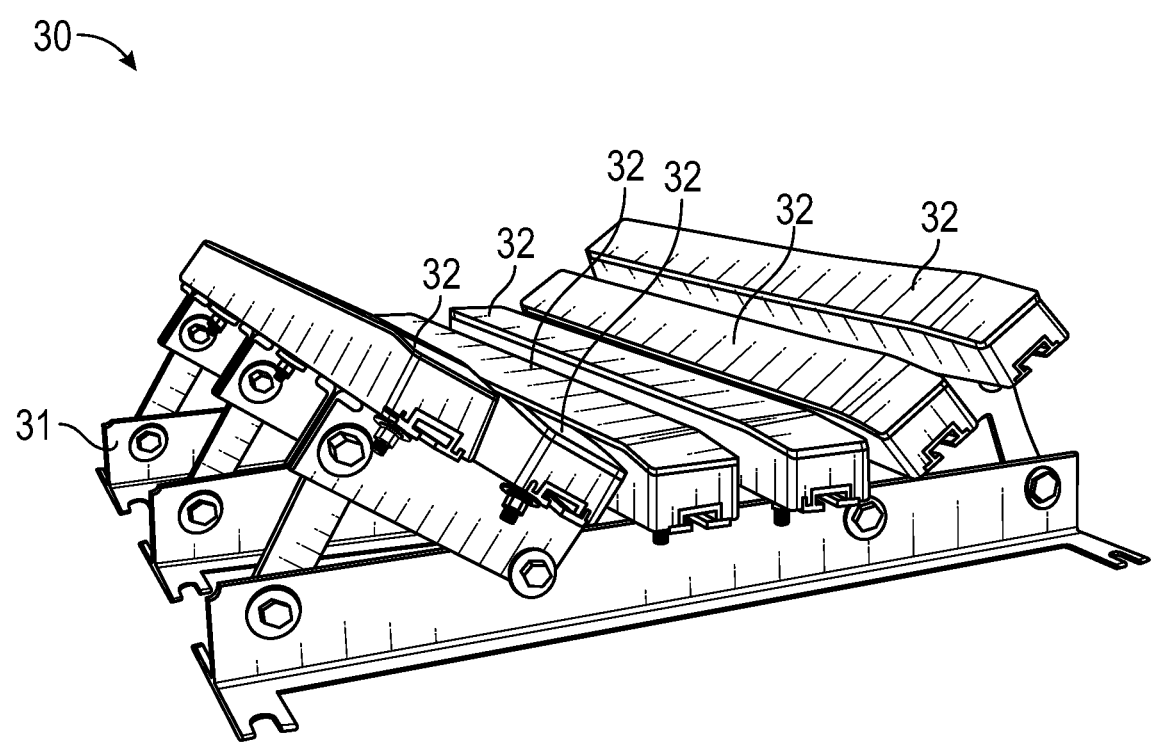
FIG. 9 shows a known impact bed.

The embodiments described herein may be advantageous as the entire length of a carrying side of a conveyor belt 160 could be utilized as a loading zone. For instance, large rock could be dropped several feet above the conveyor belt 160. In addition, the rollers 150 are able to rotate relative to each other independently. This may be particularly advantageous in composite belt configurations where different belt speeds are used. In addition, undesirable twist in the cable 110 may be minimized or eliminated since one section of the catenary idler 105 is able to rotate forward relative to the belt travel, while an opposing section is stationary or moves backward relative to the belt travel. Unlike some known catenary idlers 105, the embodiments described herein do not utilize a bearing 13 at each end of each roller 15 (shown in FIG. 7) and do not require rotation of all of the rollers 25 in unison (shown in FIG. 8). Additional advantages may be recognized in a mobile conveying system, wherein the conveyor frame 101 transitions from a straight section to a curved section, or forms a compound curve, such as the English letter "S". The outer edges of the conveyor frame 101 can change length relative to each other without inducing a twist in the catenary idler 105. Other examples of a mobile conveying system 200 (shown in FIG. 5) include railroad applications, such as railcar frame 201 supporting a plurality of catenary idlers 105 formed of a cable 110, bearing surfaces 131, and rollers 150. The lengths of the sides of a conveyor belt 160 may change as the railcar navigates curves on a railroad track.

Figure 4:
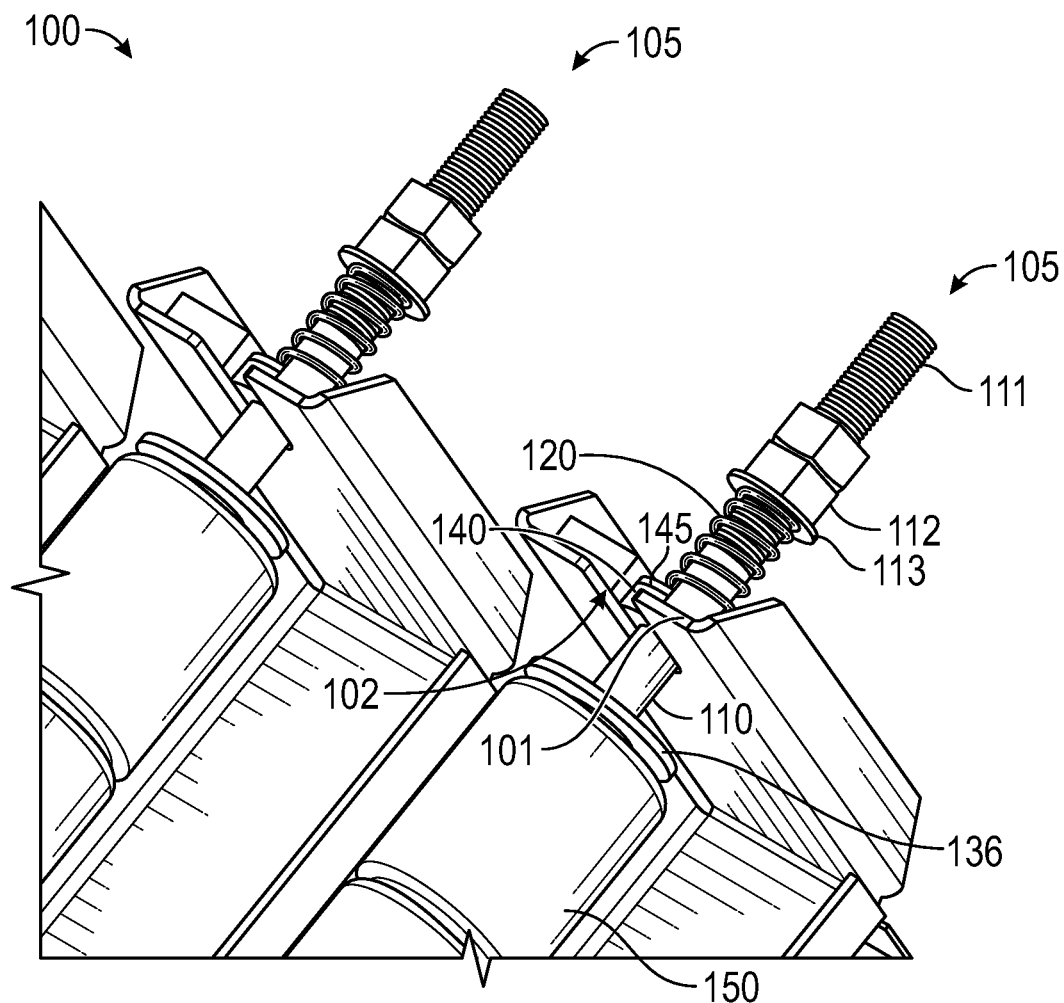
FIG. 4 shows a cross-sectional view of an end portion of the embodiment of the conveying system of FIG. 1.

FIG. 4 is a detailed view of an end portion of the conveying system 100. Referring to FIGS. 2 and 4, in some embodiments, the cable 110 is rotatably supported upon the frame 101 at the first end 111 and the second end 116. The cable 110 may be rotatably supported by a thrust bearing 140 at each end. The cable 110 may be rotatably supported by the thrust bearing 140 by an interface between a swaged fitting 145 and the thrust bearing 140. Additional advantages may be recognized in high rotational speed applications where the amount of slip between the rollers 150 and the bearing surfaces 131 are reduced by rotation of the cable 110. In some lower impact applications, the cable 110 may be supported by a thrust bearing 140 but not compression springs 120.

The cable 110 may include swaged fittings 145 on the first end 111 and/or the second end 116. The swaged fittings 145 may be used to connect the catenary idler 105 to the conveyor frame 101 of the conveying system 100. Other types of connectors may be used.

In some embodiments, the ends of the cable 110 may each be supported upon a compression spring 120. The ends of the cable 110 may be connected to a washer 113 with the cable 110 extending through an opening 102 in the conveyor frame 101. A compression spring 120, such as a coiled spring, is disposed between the washer 113 and the conveyor frame 101. The first end 111 of the catenary idler 105 may be threaded to receive a nut 112 and/or the second end 116 of the catenary idler 105 may be threaded to receive a nut 117, which can be tightened to adjust the preload on the compression springs 120. Additional advantages may be recognized in high impact applications where the impact upon the catenary idlers 105 pulls downward upon the washer 113 and compresses the compression spring 120. In some lower speed applications, the cable 110 may be supported only upon compression springs 120 but not thrust bearings 140.

In some high impact, high rotational speed applications, the cable 110 may be supported upon both compression springs 120 and thrust bearings 140. In some low impact, low rotational speed applications, the cable 110 may be supported upon neither compression springs 120 nor thrust bearings 140.

In some embodiments, a troughing angle α of between 15 and 45 degrees is used. A plurality of catenary idlers 105 are spatially separated along the length of a conveying system 100. The conveying system 100 may form an impact bed. The plurality of catenary idlers 105 may be positioned with the cables 110 spaced approximately 1.5-4 times the outer diameter of the rollers 150 to form a high impact loading zone of a conveying system 100. This configuration may provide lower friction than known impact beds. The plurality of catenary idlers 105 may be positioned under a portion of a conveyor belt 160 (shown in FIG. 2) located under a loading chute.

In use, the catenary idlers 105 may be utilized to support a payload, such as aggregate on a conveyor belt 160. Heavy materials may be loaded anywhere along the length of the conveyor belt 160. As materials are dropped upon the conveyor belt 160, the weight is distributed through the catenary idlers 105. The impact force may be transmitted through the cable 110 and into the compression springs 120 located at the opposing ends 111, 116 of the cable 110.

As the conveyor belt 160 begins rotation, the conveyor belt 160 slides or rolls along the rollers 150. End caps 136 may be placed between the rollers 150 and the frame 101 to prevent the rollers 150 from contacting the frame 101. As the friction between the conveyor belt 160 and the rollers 150 increases, the rollers 150 begin to rotate upon the bearing surface 131 with the bearing surface 131 remaining stationary relative to the cable 110. In embodiments where the cable 110 is rotatably supported upon the frame 101, the rotation of the rollers 150 upon the bearing surfaces 131 and the rotation of the cable 110 (and thereby the bearing surfaces 131 disposed on the cable 110) rotate together to reduce resistance to the conveyor belt 160. Depending upon the resistance between the rollers 150 and the bearing surfaces 131 and in the thrust bearings 140, the catenary idler 105 reaches a state of equilibrium. For instance, the static friction between the rollers 150 and the bearing surfaces 131 may be greater than the static friction of the thrust bearings 140, causing the thrust bearings 140 (and thereby the cable 110) to begin rotation first. As the conveyor belt 160 and the bearing surfaces 131 exert force upon the rollers 150, the rollers 150 may begin to rotate. In other embodiments, the rollers 150 may begin rotation before the cable 110. Through the simultaneous rotation of both the rollers 150 and the cable 110, greater rotational speeds of the conveyor belt 160 may be achieved.

Figure 6:
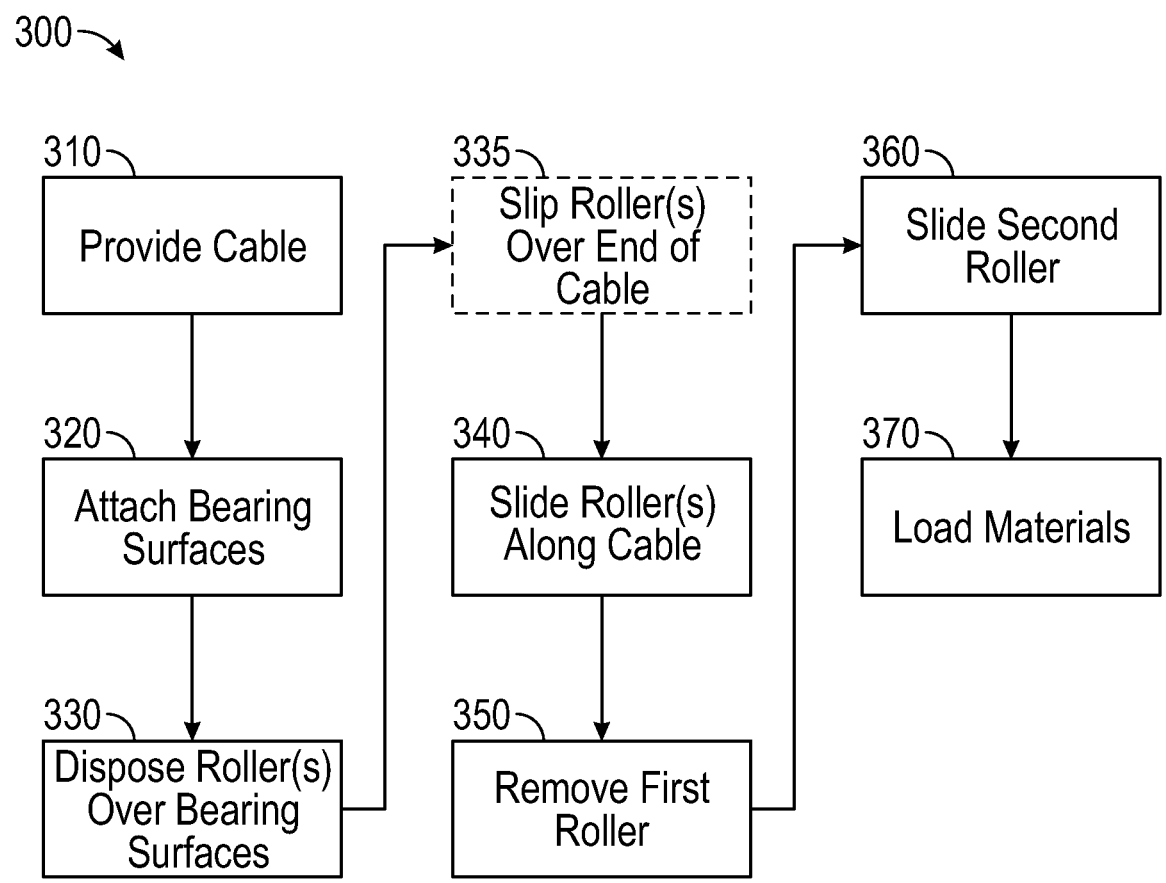
FIG. 6 illustrates an embodiment of a method of configuring a conveying system.

FIG. 6 illustrates an embodiment of a method 300 of configuring a conveying system 100. The method 300 includes providing 310 a cable 110. The installation of a catenary idler 105 may include cutting a cable 110 to length and swaging a first end 111. A plate, such as a washer 113 is supported against the swaged fitting 145 and the cable 110 is threaded downward through the center of a compression spring 120 and a conveyor frame 101. Method 300 includes fixedly attaching 320 bearing surfaces 131 along a length of the cable 110. Clamps 130 may be fixed to the cable 110 at a predetermined frequency along a length of the cable 110 to form the bearing surfaces 131. The clamps 130 may include a concaved surface to form the trough shape of the catenary idler 105. The use of clamps 130 may be advantageous as to increase the repairability of a catenary idler 105 in the event of a component failure. In some embodiments, bearing surfaces 131 may be created by casting upon the cable 110, rather than by clamps 130. The second end 116 of the cable 110 may be swaged with the bearing surfaces 131 already formed along the cable 110.

Method 300 includes disposing 330 the rollers 150 over the bearing surfaces 131 and sliding 340 the rollers 150 along the length of the cable 110 to form the trough shape of the catenary idler 105. In some embodiments, disposing 330 the rollers 150 may comprise slipping 335 the rollers 150 over one of the swaged ends of the cable 110. An inner bore 155 of the roller 150 may be larger than the swaged fitting 145 to permit the roller 150 to pass over the swaged end. The inner bore 155 of the rollers 150 is received over the clamps 130. The inner bore 155 of the rollers 150 may have a concave shape corresponding to the concave shape of the clamps 130. A diameter $d_3$ of the inner bore 155 of the rollers 150 may increase along the length of the roller 150 away from the center of the roller 150 to assist with movement of the rollers 150 laterally across the clamps 130, such as in curved sections of the trough shape. The rollers 150 may include a concaved outer surface 151 to support the conveyor belt 160 and form the trough shape of the catenary idler 105.

If a roller 150 becomes damaged, method 300 may include removing 350 a first roller 150, sliding 360 a second roller 150 into its place, and loading materials 370 onto the replaced roller 150. For instance, a roller 150 near the middle of the catenary idler 105 may be cut out and adjacent rollers 150 may be moved along the length of the cable 110 to fill a space previously occupied by the removed roller 150. A new roller 150 may be slipped over the swaged fitting 145 in order to maintain the total number of rollers 150.

Although this disclosure has been described in terms of certain preferred embodiments, other embodiments that are apparent to those of ordinary skill in the art, including embodiments that do not provide all of the features and advantages set forth herein, are also within the scope of this disclosure.

What is claimed is:

1. A catenary idler comprising:
   a cable;
   a plurality of bearing surfaces disposed along a length of the cable, the plurality of bearing surfaces being fixed to the cable; and
   a plurality of rollers each including an inner bore extending along a length of the roller, the plurality of rollers disposed over the plurality of bearing surfaces, the plurality of rollers being supported upon the plurality of bearing surfaces, the plurality of bearing surfaces providing contact surfaces for the inner bores of the plurality of rollers with the plurality of rollers being rotatable with respect to the plurality of bearing surfaces.

2. The catenary idler of claim 1, further comprising a first compression spring at a first end of the cable and a second compression spring at a second end of the cable.

3. The catenary idler of claim 2, further comprising a washer disposed on the first end of the cable, the cable passing through a center of the first compression spring and a conveyor frame, the first compression spring being disposed between the washer and the conveyor frame.

4. The catenary idler of claim 1, wherein the plurality of bearing surfaces are a plurality of clamps fixed to the cable at a predetermined frequency along the length of the cable.

5. The catenary idler of claim 1, wherein the cable is rotatably supported at its first end and at its second end.

6. The catenary idler of claim 1, wherein the rollers are formed of a material having a low coefficient of friction.

7. The catenary idler of claim 6, wherein the material having a low coefficient of friction is an oil impregnated nylon.

8. The catenary idler of claim 1, wherein the plurality of bearing surfaces each have a concaved, cylindrical shape.

9. The catenary idler of claim 8, wherein a diameter of the inner bore increases along the length of the roller away from a center of the roller.

10. The catenary idler of claim 9, wherein a first end of the cable includes a swaged fitting having an outer diameter, the diameter of the inner bore at the center of each of the plurality of rollers being greater than the outer diameter of the swaged fitting.

11. The catenary idler of claim 1, wherein each of one or more of the plurality of rollers is supported simultaneously upon adjacent bearing surfaces of the plurality of bearing surfaces.

12. The catenary idler of claim 1, wherein adjacent rollers of the plurality of rollers are independently rotatable from each other.

13. The catenary idler of claim 1, wherein the plurality of rollers are slidable with respect to the plurality of bearing surfaces along a length of the cable.

14. A method of configuring a catenary idler includes:
    attaching a plurality of bearing surfaces along a length of a cable, the plurality of bearing surfaces being fixed with respect to the cable; and
    disposing a plurality of rollers over the plurality of bearing surfaces, the plurality of rollers each including an inner bore extending along a length of the roller, the plurality of bearing surfaces contacting the inner bores of the plurality of rollers with the plurality of rollers being rotatable with respect to the plurality of bearing surfaces.

15. The method of claim 14, further comprising supporting each of one or more of the plurality of rollers simultaneously upon adjacent bearing surfaces of the plurality of bearing surfaces.

16. The method of claim 14, further comprising:
    slipping the plurality of rollers over a first end of the cable; and
    sliding the plurality of rollers along the length of the cable.

17. The method of claim 14, further comprising:
    removing a first roller of the plurality of rollers, the first roller being adjacent to a second roller of the plurality of rollers; and
    sliding the second roller along the length of the cable to occupy a space previously occupied by the first roller.

18. A conveying system comprising:
    a frame;
    a conveyor belt; and
    a plurality of catenary idlers supported upon the frame, the conveyor belt being supported upon the plurality of catenary idlers, each of the plurality of catenary idlers comprising
    a cable;
    a plurality of bearing surfaces disposed along a length of the cable, the plurality of bearing surfaces being fixed to the cable; and
    a plurality of rollers each including an inner bore extending along a length of the roller, the plurality of rollers disposed over the plurality of bearing surfaces, the plurality of rollers being supported upon the plurality of bearing surfaces, the plurality of bearing surfaces providing contact surfaces for the inner bores of the plurality of rollers with the plurality of rollers being rotatable with respect to the plurality of bearing surfaces.

19. The conveying system of claim 18, wherein the cable of at least one of the plurality of catenary idlers is supported upon the frame at a first end and a second end, the first end of the cable being supported via an elastically deformable member.

20. The conveying system of claim 19, wherein the elastically deformable member is a compression spring.

21. The conveying system of claim 20, wherein the first end and the second end of the cable of the at least one of the plurality of catenary idlers are each rotatably supported upon the frame via a thrust bearing.

22. The conveying system of claim 18, wherein the cable of at least one of the plurality of catenary idlers is supported upon the frame at a first end and a second end, and the first end and the second end of the cable of the at least one of the plurality of catenary idlers are each supported upon the frame via a thrust bearing.

* * * * *